(12) United States Patent
Bhaduri et al.

(10) Patent No.: US 7,837,960 B2
(45) Date of Patent: *Nov. 23, 2010

(54) PROCESS FOR SEPARATING AND RECOVERING BASE METALS FROM USED HYDROPROCESSING CATALYST

(75) Inventors: Rahul S. Bhaduri, Moraga, CA (US); John Stiksma, St. Albert (CA); Roman Berezowsky, St. Albert (CA)

(73) Assignee: Chevron U.S.A. Inc., San Ramon, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 12/340,387

(22) Filed: Dec. 19, 2008

(65) Prior Publication Data

US 2009/0136400 A1    May 28, 2009

Related U.S. Application Data

(63) Continuation-in-part of application No. 11/946,736, filed on Nov. 28, 2007, now Pat. No. 7,658,895.

(51) Int. Cl.
C01G 37/00    (2006.01)

(52) U.S. Cl. .............................. 423/56; 423/55; 423/67; 423/68; 423/40

(58) Field of Classification Search ................... 423/54, 423/56, 67, 68, 87, 306, 139, 146, 40
See application file for complete search history.

(56) References Cited

U.S. PATENT DOCUMENTS 3,455,677 A    7/1969    Litz

| | | |
|---|---|---|
| 3,763,303 A | 10/1973 | Khuri et al. |
| 3,903,241 A | 9/1975 | Stevens et al. |
| 4,131,455 A | 12/1978 | Edwards et al. |
| 4,145,397 A | 3/1979 | Toida et al. |

(Continued)

FOREIGN PATENT DOCUMENTS

JP    6228666 A2    8/1994

*Primary Examiner*—Melvin C Mayes
*Assistant Examiner*—Melissa Stalder
(74) *Attorney, Agent, or Firm*—Steven R. Ellinwood

(57) ABSTRACT

A method is disclosed for separating and recovering base metals from a used hydroprocessing catalyst originating from Group VIB and Group VIII metals and containing at least a Group VB metal. In one embodiment, the method comprises the steps of: contacting the used catalyst with an ammonia leaching solution under conditions sufficient to dissolve the group VIB metal and the Group VIII metal into the leaching solution; forming a leached slurry containing at least a group VIB metal complex and at least a group VIII metal complex, ammonium sulfate and a solid residue containing at least a Group VB metal complex and coke; separating and removing from the leached slurry the solid residue and coke; precipitating from the remaining solution at least a portion of the Group VIB metal complex and at least a portion of the Group VIII metal complex by controlling the pH to form a liquid material substantially free of Group VB, Group VIB and Group VIII metals and another solid material comprising substantially Group VIB and Group VIII metal complexes. Said solid material is further processed by dissolution, means of separation, further means of precipitation and oxidative dissolution to produce, separately, a Group VIB metal product solution, a Group VIII metal product solution and a purified ammonium sulfate product solution.

30 Claims, 1 Drawing Sheet

U.S. PATENT DOCUMENTS

| | | |
|---|---|---|
| 4,216,118 A | 8/1980 | Yoshida et al. |
| 4,220,634 A | 9/1980 | Deschamps et al. |
| 4,374,100 A | 2/1983 | Sebenik et al. |
| 4,409,190 A | 10/1983 | Van Leirsburg |
| 4,417,972 A | 11/1983 | Francis et al. |
| 4,432,953 A | 2/1984 | Hubred et al. |
| 4,434,043 A | 2/1984 | Singhal et al. |
| 4,500,495 A | 2/1985 | Hubred et al. |
| 4,541,868 A | 9/1985 | Lowenhaupt et al. |
| 4,548,700 A | 10/1985 | Bearden, Jr. et al. |
| 4,554,138 A | 11/1985 | Marcantonio |
| 4,661,265 A | 4/1987 | Olson et al. |
| 4,762,812 A | 8/1988 | Lopez et al. |
| 4,832,925 A | 5/1989 | Weir et al. |
| 4,861,565 A | 8/1989 | Sefton et al. |
| 4,900,522 A | 2/1990 | Chou et al. |
| 5,099,047 A | 3/1992 | Sato et al. |
| 5,246,570 A | 9/1993 | Cronauer et al. |
| 5,415,849 A | 5/1995 | Toyabe et al. |
| 5,457,258 A | 10/1995 | Hommeltoft et al. |
| 5,505,857 A | 4/1996 | Misra et al. |
| 5,573,556 A | 11/1996 | Wen |
| 6,153,155 A | 11/2000 | Wen et al. |
| 6,180,072 B1 | 1/2001 | Veal et al. |
| 6,589,492 B2 | 7/2003 | Matsumoto et al. |
| 6,673,732 B2 | 1/2004 | Muhler et al. |
| 6,733,564 B1 | 5/2004 | Sahu et al. |
| 7,033,480 B2 | 4/2006 | King |
| 7,067,090 B2 | 6/2006 | Han et al. |
| 7,182,926 B2 | 2/2007 | Akahoshi |
| 7,255,795 B2 | 8/2007 | Panariti et al. |
| 2003/0130118 A1 | 7/2003 | Koyama et al. |
| 2004/0219082 A1 | 11/2004 | Matjie et al. |
| 2004/0237720 A1 | 12/2004 | Moyes et al. |
| 2004/0241066 A1 | 12/2004 | Jasra et al. |
| 2005/0118081 A1 | 6/2005 | Harris et al. |
| 2005/0249652 A1 | 11/2005 | Scharifker et al. |
| 2006/0051875 A1 | 3/2006 | Reppy et al. |
| 2006/0135631 A1 | 6/2006 | Kopponen et al. |
| 2006/0151399 A1 | 7/2006 | Brandts et al. |
| 2006/0258531 A1 | 11/2006 | Koyama et al. |
| 2007/0025899 A1 | 2/2007 | Marcantonio |
| 2007/0098609 A1 | 5/2007 | McConnell |
| 2007/0144944 A1 | 6/2007 | Del Bianco et al. |

US 7,837,960 B2

PROCESS FOR SEPARATING AND RECOVERING BASE METALS FROM USED HYDROPROCESSING CATALYST

RELATED APPLICATIONS

This application is a continuation-in-part of and claims priority to U.S. patent application Ser. No. 11/946,736 filed Nov. 28, 2007.

TECHNICAL FIELD

The invention relates to a process for separating and recovering individual metals from used hydroprocessing catalyst.

BACKGROUND

Catalysts have been used widely in the refining and chemical processing industries for many years. Hydroprocessing catalysts, including hydrotreating and hydrocracking catalysts, are now widely employed in facilities worldwide. Used and "spent" hydroprocessing catalysts discharged from these facilities typically contain metal components such as molybdenum, nickel, cobalt, vanadium, and the like.

With the advent of the need to refine heavier crude feedstock, refiners are forced to use more catalysts than before for hydroprocessing to remove metals, sulfur and other contaminants from the feedstock. These catalytic processes generate huge quantities of spent catalyst. With the increasing demand and market price for metal values and environmental awareness thereof, catalysts can serve as an economic source for recovery of metals useful for catalyst synthesis and other uses.

In order to recycle catalytic metals and provide a renewable source for the metals, efforts have been made to extract metals from spent catalysts, whether in supported or bulk catalyst form. US Patent Publication No. 2007/0,025,899 discloses a process to recover metals such as molybdenum, nickel, and vanadium from a spent catalyst with a plurality of steps and equipment to recover the molybdenum and nickel metal complexes. U.S. Pat. No. 6,180,072 discloses another complex process requiring solvent extraction as well as oxidation steps to recover metals from spent catalysts containing at least a metal sulphide.

There is still a need for an improved and simplified process to recover metals including but not limited to molybdenum, nickel, and vanadium from used hydroprocessing catalysts.

SUMMARY OF THE INVENTION

In one aspect, the invention relates to a method for recovering base metals including vanadium from a used dispersed catalyst originating from a Group VIB metal sulfide catalyst promoted with a Group VIII metal for hydrocarbon oil hydroprocessing, the method comprising the steps of: contacting the used catalyst with a leaching solution containing ammonia and air to dissolve the group VIB metal and the Group VIII metal into the leaching solution, forming a pressure leach slurry containing at least a group VIB soluble metal complex, at least a group VIII soluble metal complex, ammonium sulphate and a first solid residue containing ammonium metavanadate and coke; separating and removing the first solid residue containing ammonium metavanadate and coke from the pressure leach slurry to form a first pressure leach solution; precipitating from the first pressure leach solution at least a portion of the Group VIB metal and at least a portion of the Group VIII metal, wherein the precipitation is carried out at a first pre-selected pH to precipitate a second solid residue comprising as metal complexes at least a portion of the Group VIB metal and at least a portion of the Group VIII metal and forming a slurry comprising the second solid residue and a primary filtrate comprising ammonium sulfate solution that is substantially free of Group VB, Group VIB and the Group VIII metals; by a means of separation separating from said slurry the second solid residue and the primary filtrate; dissolving the second solid residue, at a second pre-selected pH, to form a group VIB metal precipitate and a group VIII metal containing solution; separating the group VIB metal precipitate from the Group VIII metal containing solution and dissolving said Group VIB metal precipitate in a dilute base at a sufficient temperature to form a Group VIB metal product.

In another aspect, the invention relates to a method for recovering vanadium, molybdenum and nickel from the used catalyst to recover substantial amounts of a Group VIII metal, the method comprising: recovering a secondary filtrate comprising substantially the Group VIII soluble metal complex and a trace amount of Group VB and Group VIB metals; combining the secondary filtrate with the primary filtrate to form a combined filtrate comprising substantially the Group VIII soluble metal complex and a trace quantity of Group VB and Group VIB metals; precipitating from the combined filtrate the Group VB, Group VIB and Group VIII metals in a sulfidation process to form a third solid residue and a tertiary filtrate; separating the third solid residue from the tertiary filtrate and dissolving the third solid residue to form a group VIII metal product solution.

In another embodiment, the invention relates to a method for recovering vanadium, molybdenum, and nickel from a used catalyst and producing ammonium sulfate useful for other processes, such as fertilizer, the method comprising: all of the above processes and further comprising subjecting the tertiary filtrate to sulfamate destruction by hydrolysis to recover a purified ammonium sulfate solution.

In another aspect, the invention relates to a method for recovering vanadium, molybdenum and nickel from a used catalyst, the method comprising the steps of: contacting the used catalyst with a leaching solution containing ammonia and air to dissolve the molybdenum and nickel into the leaching solution, forming a pressure leach slurry containing molybdenum and nickel metal complexes, ammonium sulphate and solid residue containing ammonium metavanadate and coke; separating and removing the solid residue containing ammonium metavanadate and coke from the pressure leach slurry; adjusting the pH of the pressure leach solution by the addition of sulfuric acid to precipitate at least a portion of the molybdenum and nickel as metal complexes; separating and recovering molybdenum and nickel metal complexes from the pressure leach solution containing 0.1 to 5% of the incoming molybdenum, 1 to 20% of the incoming vanadium, and 1 to 35% of the incoming nickel.

In another embodiment, the method further comprises the step of adding $H_2S$ to a combination of the primary filtrate and the secondary filtrate to precipitate the remaining molybdenum, nickel and vanadium metal complexes, and recovering, by a means of separation, a solid residue comprising molybdenum and nickel sulfides and vanadium oxides and a filtrate comprising primarily ammonium sulfate and minor amounts of molybdenum, nickel and vanadium. In another embodiment said solid residue is leached at acidic pH in the presence of oxygen, for a sufficient time and at a sufficient temperature, to form a desirable nickel sulfate product solution. In yet another embodiment the filtrate, comprising primarily ammonium sulfate, is processed hydrolyze sulfamate to produce a purified, commercial grade, ammonium sulfate product having very low amounts of molybdenum, nickel and vanadium metals that can be further processed for other uses, such as for fertilizer.

DETAILED DESCRIPTION

Figure 1:
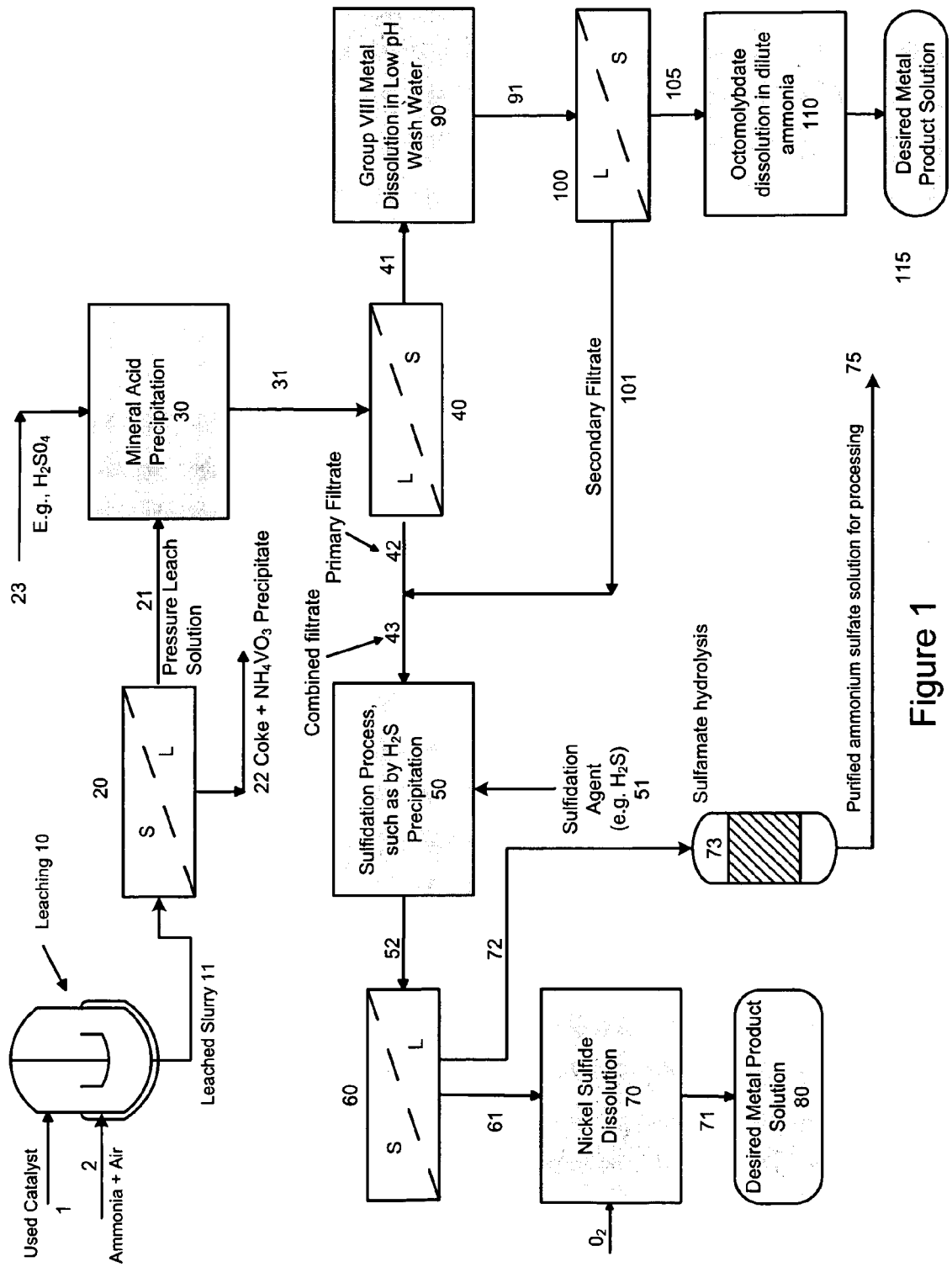
FIG. 1 provides an overview of an embodiment of the metal separation and recovery process.

The following terms will be used throughout the specification and will have the following meanings unless otherwise indicated.

As used herein, "hydroprocessing" is meant any process that is carried out in the presence of hydrogen, including, but not limited to, methanation, water gas shift reactions, hydrogenation, hydrotreating, hydrodesulfurization, hydrodenitrogenation, hydrodemetallation, hydrodearomatization, hydroisomerization, hydrodewaxing and hydrocracking including selective hydrocracking.

As used herein, the phrase "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

The Periodic Table referred to herein is the Table approved by IUPAC and the U.S. National Bureau of Standards. An example is the Periodic Table of the Elements by Los Alamos National Laboratory's Chemistry Division available as of the filing date of this Application at http://periodic.lanl.gov/default.htm.

In one embodiment, the used catalyst originates from a dispersed (bulk or unsupported) Group VIB metal sulfide catalyst containing at least one of: a Group VB metal such as V, Nb; a Group VIII metal such as Ni, Co; a Group VIIIB metal such as Fe; a Group IVB metal such as Ti; a Group IIB metal such as Zn, and combinations thereof. In another embodiment, the used catalyst originates from a dispersed (bulk or unsupported) Group VIB metal sulfide catalyst promoted with a Group VIII metal for hydrocarbon oil hydroprocessing. Promoters are typically added to a catalyst formulation to improve selected properties of the catalyst or to modify the catalyst activity and/or selectivity.

In another embodiment, the used catalyst originates from a bulk catalyst precursor of the formula $(X)_a(M)_b[(CH_3CH_2)_cN(CH_3)_3]_dO_z$ as disclosed in US Patent Publication No. 20060060502, wherein X is a Group VIII non-noble metal, M is selected from Mo and W, c is an integer from 10 to 40, the molar ratio of a:b is from 0.5/1 to 3/1. In another embodiment, the used catalyst originates from a hydroprocessing catalyst represented by the formula $(M^t)_a(X^u)_b(S^v)_d(C^w)_e(H^x)_f(O^y)_g(N^z)_h$ as disclosed in U.S. patent application Ser. No. 11/931,972 with filing date of Oct. 31, 2007, wherein M represents at least one group VIB metal, such as Mo, W, etc. or a combination thereof, and X functions as a promoter metal, representing at least one of: a non-noble Group VIII metal such as Ni, Co; a Group VIIIB metal such as Fe; a Group VIB metal such as Cr; a Group IVB metal such as Ti; a Group IIB metal such as Zn, and combinations thereof (X is hereinafter referred to as "Promoter Metal"). Also in the equation, t, u, v, w, x, y, z representing the total charge for each of the component (M, X, S, C, H, O and N, respectively); ta+ub+vd+we+xf+yg+zh=0. The subscripts ratio of b to a has a value of 0 to 5 (0<=b/a <=5). S represents sulfur with the value of the subscript d ranging from (a+0.5b) to (5a+2b). C represents carbon with subscript e having a value of 0 to 11(a+b). H is hydrogen with the value of f ranging from 0 to 7(a+b). O represents oxygen with the value of g ranging from 0 to 5(a+b); and N represents nitrogen with h having a value of 0 to 0.5(a+b). In one embodiment, a and b each is suitably greater than 0 such that the ratio of a:b is in the range of 1:5 to 10:1. In another embodiment, a=5; b=1 and b/a has a value of 0.2, for used catalyst compositions having precursors of the formulae $(M)_5(X)(S)_{5.5}$, $(M)_5(X)(S)_{5.5}(C)(H)(O)(N)$, $(M)_5(X)(S)_{27}(C)_{66}(H)_{42}(O)_{30}(N)_3$ amongst others. In one embodiment where both molybdenum and tungsten are present in the used catalyst as Group VIB metal complexes, the molybdenum:tungsten molar ratio is in the range of 9:1 to 1:9.

As used herein, the term "used catalyst" refers to a catalyst that has been used in a hydroprocessing operation and, as a result of such use, exhibits relatively lower or diminished catalytic activity. For example, if a reaction rate constant of a fresh catalyst at a specific temperature is assumed to be 100%, the reaction rate constant for a used catalyst temperature is 80% or less in one embodiment, and 50% or less in another embodiment. In one embodiment, the metal components of the used catalyst comprise at least one of Group VB, VIB, and VIII metals, e.g., vanadium, molybdenum, tungsten, nickel, and cobalt. The most commonly encountered metal to be recovered is molybdenum. In one embodiment, the metals to be recovered from the used catalyst are sulfides of Mo, Ni, and V.

In the sections that follow, the reference to "molybdenum" is by way of exemplification only for component (M) in the above formulae and is not intended to exclude other Group VIB metals/compounds and mixtures of Group VIB metal/compounds represented by (M) in the catalyst formula. Similarly, the reference to "nickel" is by way of exemplification only for the component (X) in the above formulae and is not meant to exclude other Promoter Metals, i.e., group VIII non-noble metal components; Group VIIIB metals; Group VIB metals; Group IVB metals; Group IIB metals and mixtures thereof that can be used in the catalyst formula.

As used herein, the reference to "vanadium" is by way of exemplification only for any Group VB metal component that may be added to the hydroprocessing catalyst or is present in the hydroprocessing feedstock, and is not intended to exclude other Group VB metals/compounds and mixtures of that may be present in the used hydroprocessing catalyst for metal recovery.

In the sections that follow, the reference to "incoming molybdenum" (or "incoming nickel," or "incoming vanadium," etc.) refers to the amount of metal that is initially present in the used catalyst prior to the metal recovery process.

In a hydroprocessing operation, a catalyst is typically enriched/deactivated with nickel and vanadium as "contaminants" in an amount ranging up to about 100 wt % of the fresh catalyst weight. In some operations, due to the rapid coke deposition rate, the catalyst is deactivated prior to achieving its full metals adsorption capacity. Such catalysts are taken out of service when the used catalyst contains as little as 10 wt % nickel plus vanadium compounds.

In one embodiment, the used catalyst is generally in the form of a dispersed suspension having an effective median particle size of 0.01 to 200 microns. In another embodiment, the used catalyst has an average particle size of 0.01 to 100 microns. In a third embodiment, the used catalyst is a dispersed slurry having an average particle size of 0.01 to 50 microns. In one embodiment, the used catalyst has a pore volume of 0.05-5 ml/g as determined by nitrogen adsorption.

FIG. 1 is a brief overview of one embodiment of the metal recovery process. Prior to metal recovery, used catalyst recovered from an upstream hydroprocessing unit in one embodiment is first washed/deoiled to remove from the used catalyst greater than 98 wt % of the hydrocarbons and product oils. The deoiling step is not shown in FIG. 1. Methods for deoiling/removing oils from solids containing used catalysts are known in the art. In one embodiment, the used catalyst is deoiled in contact with a sub-critical dense phase gas in a process as described in WO06117101A1. In another embodiment, the used catalyst is deoiled with the use of an organic solvent, e.g., xylene, benzene, toluene, kerosene, etc., under an inert atmosphere, and dried to remove the organic solvent. Following deoiling, the solvent is stripped and separated from the hydrocarbon oil and recycled. The recovered oil is recycled to the upstream hydroprocessing unit. In yet another embodiment, deoiling is carried out using separation techniques including membrane/ion exchange, nano-filtration, cross flow filtration and the like, reducing the hydrocarbon content to less than 2 wt %.

Leaching: In one embodiment, the deoiled and dried used catalyst particles in stream 1 are leached with an aqueous solution 2 containing ammonia and air in an autoclave 10, i.e., a multi-chambered, agitated vessel at a sufficient temperature and pressure, in which ammonia and air are supplied to induce leaching reactions, wherein the group VIB and group VIII metals are leached into solution forming group VIB and group VIII soluble metal complexes. In one embodiment, up to 90% of the (incoming) group VB metal in the feed stays in the coke phase (following discharge from the autoclave) and up to 10% of the incoming group VB metal is leached into solution. For example, for a used catalyst feed stream containing 0.5 wt. % vanadium, up to 0.050 wt % ends up in the leach solution (based on the total weight of the feed stream).

In one embodiment, vanadium is converted into ammonium metavanadate, molybdenum is converted into molybdate compounds, including ammonium orthomolybdate and portions of nickel and cobalt (if any) are converted into amine complexes, e.g., cobalt amine sulfate, nickel amine sulfate, or the like, thereby being leached. In one embodiment, at least 70 wt % of the group VIB and group VIII metals are leached into solution. In another embodiment, at least 90 wt % of the nickel and molybdenum are leached into solution.

In one embodiment, as shown in FIG. 1, the deoiled used catalyst in stream 1 is pressure leached according to US Patent Publication No. US2007/0025899, with the addition of ammonia and air in stream 2 to induce solubilization or leaching of metal sulfides from the used catalyst. In one embodiment of the ammoniacal is pressure leach, the leaching is carried out at a pressure proportional to the temperature. In a second embodiment, the sufficient leach temperature is between 120 to 250° C. In a third embodiment, the sufficient leach temperature is between 135 to 225° C. In one embodiment, the sufficient autoclave pressure is in the range of 0-1200 psig. In a second embodiment, from 100-1000 psig. In a third embodiment from 300 psig through about 800 psig.

In one embodiment, the used catalyst particles are pressure leached from 60 minutes to 360 minutes. In another embodiment, the used catalyst particles are pressure leached from 120 minutes to 300 minutes. In a third embodiment, the pressure leach is for a period of less than 240 minutes.

In one embodiment, the concentration of the leaching species and the pH of the leach solution are optimized with sufficient amounts of ammonia to complex the nickel, molybdenum, vanadium and cobalt (if any), and with sufficient free ammonia to control the pH within a range of 9 to 13. In one embodiment, the molar ratio of ammonia to nickel (plus any cobalt, if present) plus molybdenum plus vanadium is in the range of 20:1 to 30:1. In another embodiment, the ammonia concentration is maintained at a level of at least 1 wt %, and in a range of 2-7 wt % in yet another embodiment.

In one embodiment, the pressure leaching is carried out in an ammoniacal media at a pressure ranging from 0 to 1200 psig, at a temperature ranging from 100-300° C., and at a pH level of 8.0 or higher in order to efficiently allow the leaching reaction to progress. In another embodiment, the pH level is maintained between a range of 9 to 12.

In another embodiment (not illustrated in the FIGURE), the used catalyst is first caustic leached under atmospheric pressure, according to U.S. Pat. No. 6,180,072, for an extended period of time before the pressure leaching step.

In yet another embodiment (not shown in the FIGURE), the leached slurry 11 following depressurization is transferred to a holding tank equipped with appropriate equipment to further reduce the leached slurry temperature to 90° C. or less, prior to the next separation step.

Separating/Recovering Vanadium: The partially cooled leached slurry 11 is subject to liquid-solid separation 20 via physical methods known in the art, e.g., settling, centrifugation, decantation, or filtration using a vertical type centrifugal filter or a vacuum filter or a plate and frame filter, and the like, into a liquid stream 21 (Pressure Leach Solution stream or PLS) containing the group VIB and VIII metal complexes together with ammonium sulfate and a small amount of group VB metal complexes (up to 10 wt % of the incoming group VB metal); the solid residue 22 comprises coke and any group VB metal complex (up to 90 wt % of the incoming group VB metal). In one embodiment, the solid residue 22 comprises ammonium-containing vanadium salts such as ammonium metavanadate ($NH_4VO_3$) and coke. Vanadium, as ammonium metavanadate is subsequently recovered from the $NH_4VO_3$ coke solid residue 22. The filtrate or PLS (Pressure Leach Solution) stream 21 is then subjected to a precipitation step.

In one embodiment, liquid-solid separation of the leached slurry 11 is carried out in a filtration device, wherein the solid residue 22 containing $NH_4VO_3$ precipitate and coke is separated from the Pressure Leach Solution in the form of a filter cake containing molybdenum sulfide, nickel hydroxides and small amounts of ammonium sulfate. Group VB metals such as vanadium can be subsequently extracted/recovered from the filter cake, according to US Patent Publication No. US2007/0025899, by temperature and evaporative crystallization; purified $NH_4VO_3$ is crystallized as a wet solid and subsequently dried and calcined into vanadium pentoxide pellets. The recovered vanadium has diverse industrial applications, including use as a chemical catalyst, preparation of stainless/alloy steels, superconducting magnets and manufacturing of batteries.

In one embodiment following liquid-solid separation, the PLS stream contains 10 to 100 gpL (grams per liter) molybdenum, 1 to 20 gpL nickel, 0.05 to 2.0 gpL vanadium, and 50 to 1000 gpL ammonium sulfate. In a second embodiment, the PLS stream contains 20 to 100 gpL (grams per liter) molybdenum, 5 to 20 gpL nickel, 0.10 to 1.0 gpL vanadium, and 100 to 500 gpL ammonium sulfate.

Precipitating Metal Complexes from the Pressure Leach Solution: In one embodiment of this step, the pH of the PLS 21 is controlled to a level at which selective precipitation of the metal complexes occurs ("pre-selected pH"), precipitating as metal complexes at least 90% of the Group VIB metal, at least 90% of the Group VIII metal, and at least 40% of the Group VB metal initially present prior to the precipitation. In one embodiment, about 50-80% of the vanadium leached into the PLS is recovered with the Mo—Ni precipitate with the rest remaining in solution. Up to 90% of the vanadium in solution can be subsequently recovered in an optional subsequent sulfidation step to further precipitate any molybdenum and nickel remaining in solution.

In one embodiment, the pH is adjusted to precipitate as metal complexes at least at least 95% of the Group VIB metal. In another embodiment, the pre-selected pH is less than about 3.5 to precipitate at least 90% of soluble molybdenum complexes. In another embodiment, the pre-selected pH is from pH 1.0 to about 2.0 to initiate precipitation of at least 95% of soluble tungsten complexes. Generally, several metals can form a precipitate at a given pH. For example, at a pH level of less than 3, both Mo and Ni (and Co, if any) precipitate although more molybdenum precipitates relative to nickel. Additionally, the precipitating concept described herein can be repeated at another pH or pH range to precipitate other metals.

In one embodiment wherein the group VIB metal is molybdenum and there is an interest in precipitating most or a major portion of the molybdenum, the pH of the PLS is reduced from greater than 9.0 to less than 3.5 to precipitate greater than 90% of the Mo. In a second embodiment, the pH of the PLS is adjusted to a level of 3.0 to 3.3 to precipitate greater than 92% of the Mo. In a third embodiment, the pH of the PLS is adjusted to a level of 2.65 to 3.0 to precipitate greater than 95% of the Mo.

In one embodiment, a strong mineral acid 23 is added to the precipitating/mixing vessel 30 to adjust the pH. In another embodiment (not shown), the acid is added to the pressure leach solution 21 (PLS) feedstream. The acid used to precipitate the metal complexes may include any inorganic mineral acid with a relatively high ionization constant. In one embodiment, the acid is used in a strength ranging from 1.0 to 12.0 normal. In another embodiment, the acid is selected from the group of sulfuric acid, hydrochloric acid, phosphoric acid, nitric acid, and the like.

In another embodiment (not shown), a sulfur compound having a sulfhydryl group or an ionized sulfhydryl group or a sulfur compound, which is capable of producing a sulfhydryl group or an ionized sulfhydryl group, is used to adjust the pH of the PLS and induce precipitation. Examples include but are not limited to any sulfur compound which has a sulfhydryl (—SH) group or an ionized sulfhydryl group (—S(–1)). Compounds containing a sulfhydryl or an ionized sulfhydryl group include hydrogen sulfide and inorganic compounds containing sulfide ion, hydrosulfide ion or trithiocarbonate ion as well as organic compounds such as dithiocarbamates, xanthates, mercaptans and the soluble metal salts of these compounds, i.e., the alkali metal and alkaline earth metal salts. Furthermore, sulfur compounds which are capable of producing a sulfhydryl or an ionized sulfhydryl group, e.g., thioacetamide and reducible disulfides, can also be used. Examples of organic sulfur compounds which can be used include sodium, potassium or calcium salts of the following ions: ethyl xanthate ion, glucose xanthate ion, isopropyl xanthate ion, dimethyldithiocarbamate ion or diethyldithiocarbamate ion. Examples of inorganic sulfur compounds include sodium trithiocarbonate, potassium trithiocarbonate, calcium trithiocarbonate, sodium sulfide, potassium sulfide or calcium sulfide.

In one embodiment (not shown), the sulfur compound is a sulfide-containing compound, e.g., a water soluble sulfide, a water soluble polysulfide, or mixtures thereof, is employed to adjust the pH of the Pressure Leach Solution 21 to a level at which precipitation of the metal complexes occurs. In one embodiment, hydrogen sulfide, a combination of hydrogen sulfide and caustic soda, ammonium sulfide, NaHS, or $Na_2S$, or mixtures thereof is used in an amount of about 0.05 to 0.2 molar to precipitate out nickel, molybdenum, cobalt, and the like from the Pressure Leach Solution 21.

In one embodiment, the precipitation is carried out under mixing conditions at a temperature in the range of 50 to 95° C., a pH level of 1 to 4, and for a sufficient amount of time, e.g., for at least 1 hour, for at least 90% of the molybdenum and nickel in the PLS to precipitate out as metal complexes. In another embodiment, the precipitation is carried out at a temperature of 80° C. and a pH level of between 2.5 to 3.3. In one embodiment, at least 95% of the molybdenum precipitates out after 2 hours as a molybdenum compound such as ammonium octamolybdate. In another embodiment, at least 90% of the nickel precipitates out with the molybdenum as a $NH_4VO_3$ nickel ammonium sulfate.

In one embodiment, the pH of the PLS is continuously regulated for at least part of the precipitation step with the continuous addition of the additive, e.g., mineral acid or sulfide-containing compound, to control the rate of the precipitation as well as the type of metal complexes precipitating from the PLS.

In one embodiment, a sufficient amount of sulfuric acid (20-100% by weight) is used to adjust the pH of the PLS to less than 3.5. In another embodiment, a sufficient amount of sulfuric acid is added to the PLS to target a pH of 3.0, with the mixture being maintained at a temperature of 60-90° C. for 1 to 3 hours, until 99% of the molybdenum precipitates out as molybdate compounds.

pH controllers known in the art can be used to automatically measure and control pH of the PLS for maximizing the amount of metals precipitated from the PLS. In one embodiment, a volumetric sensor device is used to control and regulate the pH of the PLS.

Separating/Recovering Precipitate of Mo and Ni Metal Complexes: After precipitation, the solid precipitate is separated from solution by known means 40 including settling, filtration, decantation, centrifugation etc., or combinations thereof, which in one embodiment generates a primary filtrate 42 comprising low concentrations of Group VB, Group VIB and Group VIII metals and a secondary solid residue 41 comprising Group VB, Group VIB and Group VIII metal complexes, which is transferred to the vessel 90 for further separation.

In one embodiment, following solid-liquid separation (40), over 99% of the incoming molybdenum and over 90% of the incoming nickel are recovered in the unwashed precipitate 41. In another embodiment, over 98% of the incoming molybdenum and over 70% of the nickel is recovered in the unwashed precipitate 41.

In one embodiment, the unwashed precipitate 41 contains 25-50 wt % Mo, 2 to 10 wt % Ni, less than 0.5 wt % V, less than 35 wt % AmSul, 1 to 10 wt % S, with a Mo to Ni ratio ranging from 2.5:1 to 25:1. In yet another embodiment, the unwashed precipitate 41 contains up to 35 wt % Mo, 6 wt % Ni, less than 0.05 wt % V and up-to 30 wt % in Amsul, has a light greenish blue color and is soluble in hot ammoniacal solution.

In one embodiment, after liquid-solid separation, the cooled precipitate 41 is optionally washed with acidic water having a pH in the range of 2-3.5 (not shown in FIG. 1) at ambient temperature to remove adhering Amsul (ammonium sulfate) that may be entrained in the Mo—Ni precipitate. A portion of the wash water may be recycled to the leaching step as feed to the autoclave. The remaining wash water may be added to the primary filtrate 42 for additional precipitation and recovery of the residual Mo and Ni in the filtrate.

The solid precipitate 41, containing recovered metals, in one embodiment can be routed to a catalyst synthesis operation for the preparation of fresh catalysts. In another embodiment, the solid precipitate 41 undergoes further processing, for separating nickel from other metals by acid dissolution, filtration & solvent extraction. In one embodiment, the filtered solids 41 comprises of ammonium octamolybdate and a double salt of nickel ammonium sulfate can be stirred in hot, acidified water for a sufficient time to enable dissolution of the double salt of nickel from the ammonium octamolybdate. In a further embodiment, a mixture of the double salt of nickel and the precipitated ammonium octamolybdate is separated by suitable means 100 to recover as a secondary filtrate 101 a solution of nickel sulfate and ammonium sulfate and the ammonium octamolybdate precipitate 105. In one embodiment, nickel, vanadium and ammonium sulfate levels are up-to 1.0 weight %, 0.10 weight % and 10 weight %, respectively in the secondary filtrate 101. In yet another embodiment (not shown), after a displacement wash of the octamolybdate solids 105 with fresh water, the nickel, vanadium and ammonium sulfate levels are lowered in the filtrate to up-to 0.5 weight %, 0.05 weight % and 5 weight %, respectively prior to combining with the secondary filtrate 101. In another embodiment the octamolybdate solids 105, after at least one displacement wash exhibits 59.8% molybdenum, 0.05% nickel, 0.17% vanadium and 0.2% ammonium sulfate. In another embodiment, the octamolybdate solids are redissolved in dilute ammonia at a temperature ranging from 50° C. to 75° C. to yield an ammonium molybdate product solution.

The primary filtrate 42 recovered from the separation step 40 is substantially free of Group VB, VIB and Group VIII base metals. In one embodiment, substantially free means that the primary filtrate 42 recovered from the separation step contains 0.1 to 3% of the Group VIB metal in the used dispersed catalyst, 1 to 20% of the Group VB metal in the used dispersed catalyst, and 1 to 35% of the Group VIII metal in the used dispersed catalyst for metal recovery. In another embodiment, the primary filtrate 42 is primarily Amsul, with small amounts of molybdenum, vanadium, and nickel. In one embodiment, the primary filtrate 42 contains 0.1 to 2% of the incoming molybdenum, 1 to 15% of the incoming vanadium, and 1 to 30% of the incoming nickel. In another embodiment, the primary filtrate 42 contains from 0.1 to 1% of the incoming molybdenum, 1 to 10% of the incoming vanadium, and 1 to 15% of the incoming nickel. In one embodiment, primary filtrate 42 and the secondary filtrate 101 are mixed to form a combined filtrate 43 and transferred to a reactor 50 for precipitation of soluble metals using sulfidation.

Sulfide Precipitation of Residual Mo, Ni and V: In one embodiment, the pH of the combined filtrate 43 (plus optional wash water from washing the octamolybdate precipitate 105) is adjusted to further precipitate as metal sulfides the metals remaining in the Amsul filtrate. In one embodiment, the sulfidation pH is adjusted to precipitate at least 95% of the Group VIB metal and at least 95% of the Group VIII metal that were initially present in the combined filtrate 43 prior to the precipitation.

In one embodiment, the pH is maintained at a level between 7.5 and 9 in the presence of $H_2S$ gas at an overpressure between 100 and 200 kPa and temperature between 50 and 150° C. for at least one hour to obtain a precipitate of Mo, Ni sulfides, and V oxy-hydroxides. In another embodiment with cobalt being used as a promoter group VIII metal, as cobalt precipitation increases with increasingly alkaline solution pH, the pH is adjusted upward to 12 to precipitate more than 95% of the cobalt left in the combined filtrate.

In one embodiment, a water soluble sulfide-containing compound 51, e.g., a water soluble sulfide, a water soluble polysulfide, or mixtures thereof, is added to the combined filtrate 43 (and recycled wash water, if any) with pH adjustment, thus precipitating the metals dissolved therein. In one embodiment, the precipitation is carried out at a pressure from atmospheric to 100 psig and at a temperature ranging from 60° C. to 110° C. In yet another embodiment, ammonia is optionally added to the combined filtrate 43 to bring the solution pH to about 8 prior to the addition of the water soluble sulfide containing compound 51.

In one embodiment, the water soluble sulfide-containing compound is selected from the group of hydrogen sulfide, ammonium sulfide, NaHS, or $Na_2S$, or mixtures thereof. In another embodiment, sufficient hydrogen sulfide is ensured in the system by continuously maintaining an ammoniacal pH of up-to 9 to precipitate out nickel, molybdenum, cobalt, and the like from the combined filtrate 43.

Sulfide Oxidation and Dissolution: The ammonium sulfate slurry, containing Mo, Ni sulfides, and V oxy-hydroxides, is subjected to a solid-liquid separation step 60 and the resultant solids 61 comprising primarily nickel sulfide is transferred to a pressure leaching reactor 70, wherein the pH of the residue is adjusted to a range between 4.5 and 5.5 and is pressure leached in the presence of oxygen at a temperature between 160° C. and 170° C. at a total pressure ranging from 1000 to 1200 kPa for about one hour. In step 60, the solids containing residual metal sulfides and oxides are separated from the ammonium sulfate (Amsul) solution by known means including settling, filtration, decantation, centrifugation, etc., or combinations thereof. In another manifestation of this process, nickel sulfide solids are converted to a highly concentrated nickel sulfate solution having a pH of less than 1, a desired metal product solution 80. In one embodiment the conversion of nickel sulfide to nickel sulfate is in excess of 90%, in another embodiment conversion is in excess of 95% and in another embodiment conversion is about 99%.

The filtrate 72 recovered from this step is substantially free of Group VB, Group VIB and Group VIII metals, e.g., V, Mo and Ni. In one embodiment, substantially free means a removal rate of at least 90% for Group VB metals such as vanadium, and at least 95% for the Group VIB and Group VIII metals in the used catalyst, e.g., molybdenum and nickel. In one embodiment, analysis of the ammonium sulfate stream 72, shows a concentration of 300 to 800 gpL Amsul, less than 100 ppm of the group VIB metals, less than 20 ppm of the Group VIII metals, less than 100 ppm of the Group VB metals and 30 to 80 gpL sulfamate (a herbicide). In a second embodiment, the filtrate (ammonium sulfate solution) 72 has a concentration of 200 to 600 gpL Amsul, less than 50 ppm Mo, less than 10 ppm Ni, less than 50 ppm V and 20 to 60 gpL sulfamate. In a third embodiment, the filtrate 72 contains 100 to 1000 gpL ammonium sulfate, less than 100 ppm molybdenum, less than 20 ppm nickel, less than 100 ppm vanadium and 10 to 100 gpL sulfamate.

In another embodiment, a clarified ammonium sulfate effluent 72 is transferred to a reactor 73 and further subjected to sulfamate destruction by hydrolysis in the presence of steam at a temperature ranging between 210 and 250° C., a pressure ranging from 2000 kPa two 4000 kPa and a retention time of between 0.5-hours each such and 1.5-hours to produce a purified ammonium sulfate solution product 75 suitable for further processing, such as for fertilizer.

In one embodiment, a filter press or other suitable means for separation is used to separate the metal sulfide precipitate 61 from the ammonium sulfate solution 72. The solids 61, containing precipitated metal sulfide and oxides, are optionally sent to a holding tank (not shown in FIG. 1) for subsequent metals recovery through the autoclave. In another embodiment, the solids 61, containing precipitated metal sulfides, are optionally sent to a holding tank (not shown in FIG. 1) for off-site disposal to metals reclaimers.

EXAMPLES

The following illustrative examples are not intended to be limiting.

Example 1

In this example, a pressure leach solution (deep blue color) stream with a pH of 9.2 was adjusted to ~33.0 by single stage addition of concentrated sulfuric acid (96%). The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 70° C., about 99% of the molybdenum precipitates out as a molybdenum compound. Approximately 98% of the residual Ni also precipitates out with the molybdenum. It is believed that the compound is a mixture of ammonium octamolybdate and nickel ammonium sulfate.

The slurry is cooled to ambient and filtered to remove the precipitate. The precipitate is optionally double-washed with pH 3.0 water at ambient temperature to remove entrained ammonium sulfate. During the washing step, an additional 23% of Ni re-solubilizes to achieve a final Ni recovery of about 75%. Minimal re-solubilization of Mo occurs. The final solution (including wash) analyzes 0.53 gpL Mo, 1.49 gpL Ni, and 0.08 gpL V, for a metal precipitation efficiency of 99.2% Mo, 76.4% Ni, and 27.9% V.

The precipitate, appearing as light greenish with blue tinges, is soluble in hot ammoniacal solution. An analysis of the washed precipitated solids reveals a moisture content of 34.2 wt %, 42.6 wt % Mo (dry basis), 3.17 wt % Ni (dry basis), minimal V (less than 0.02 wt %), 6.8 wt % Amsul, 3.4 wt % S and a Mo/Ni ratio of 13.4. The solids were not treated for additional separation of the Mo & Ni from each other.

In the next step, a portion of the wash water is recycled to the autoclave feed. The remaining wash water and filtrate, which is primarily ammonium sulfate (Amsul), contain low levels of Mo & V together with moderate amounts of Ni. The solution pH is increased to about 8 with ammonia addition followed by sulfidation with $H_2S$ gas under pressure at 100-kPa (15-psi) for 2-hours. The pH is maintained between 7 & 8 at a temperature of 100° C. following which a precipitate of Mo, Ni and V sulfides and oxides is obtained. The slurry undergoes liquid-solid separation and the Amsul stream is further processed for purification and recovering ammonium sulfate for use as fertilizer. Analysis of the final Amsul stream depicts 440 gpL Amsul, with 45 ppm Mo, less than 5 ppm Ni, and 26 ppm V.

Following precipitation, filtering and washing of the sulfided solids, the cake containing recovered metal sulfides is stored in a tank for off-site disposal to metals reclaimers.

Example 2

Example 1 is repeated with a PLS stream having a pH of 10.6, containing 53 gpL free $NH_3$, 85 gpL Mo, 8.24 gpL Ni, 0.40 gpL V and 271 gpL ammonium sulfate (Amsul). The PLS stream pH is adjusted to 2.71. The final solution (including wash) shows 0.48 gpL Mo, 1.44 gpL Ni, and 0.08 gpL V, for a metal precipitation efficiency of 99.2% Mo, 77.3% Ni, and 75% V. The washed precipitated solids gave a moisture content of 25.9 wt %, 41.8 wt % Mo (dry basis), 3.37 wt % Ni (dry basis), 0.16 wt % V, 3.8 wt % AmSul, 2.76 wt % S and a Mo/Ni ratio of 12.4. The solids were not treated for additional separation of the Mo & Ni from each other.

After sulfidation of the filtrate, the final Amsul stream concentration showed 500 gpL Amsul, with 41 ppm Mo, less than 5 ppm Ni, and 26 ppm V.

Example 3

In this example, a PLS stream with a pH of 9.2 was adjusted to ~3.0 by single stage addition of concentrated sulfuric acid (96 wt. %). The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 80° C., about 99% of the molybdenum precipitated out as a molybdenum compound. Approximately 98% of the residual Ni also precipitated out with the molybdenum resulting in a slurry comprising of ammonium octamolybdate and a double salt of nickel ammonium sulfate; following liquid-solid separation of the cooled slurry, the Amsul primary filtrate containing low levels of molybdenum, nickel and vanadium was set aside for combination with the secondary filtrate generated from the process below.

The molybdenum/and nickel precipitate, which appeared as light greenish with blue tinges, revealed a dry basis Mo content of 35 wt %, 3.5 wt % Ni, 0.1 wt % V and 24 wt % Amsul.

To separate the molybdenum from nickel, the slurry was cooled to ambient temperature and filtered; the solids were repulped at 25-wt % solids in hot (80° C.) pH 2 acidified water for 30-minutes enabling dissolution of the double salt of nickel from the ammonium octamolybdate solids as per the following reaction:

$$NiSO_4.(NH_4)_2SO_4.6H_2O(s) \rightarrow 6H_2O(aq) + NiSO_4(aq) + (NH_4)_2SO_4(aq) \quad (1)$$

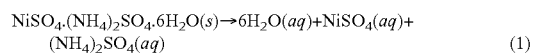

The resulting mixture was filtered to separate the undissolved octamolybdate solids from the nickel and ammonium sulfate solution comprising the secondary filtrate. Table 1 shows Ni, V and ammonium sulfate levels of 0.36-wt %, 0.16-wt % and 4-wt % respectively in the repulped and filtered octamolybdate cake. A displacement wash of the solids with fresh water lowered Ni, V and ammonium sulfate levels to 0.05-wt %, 0.17-wt % and 0.2-wt % respectively in the octamolybdate cake. During the washing step, greater than 99% of Ni and Amsul re-solubilized from the cake. Minimal re-solubilization of Mo and V occurred from the octamolybdate cake.

TABLE 1

Repulp-Displacement Wash Data for Separating Ni & Amsul from Octamolybdate Solids

| Mo | Ni | V | Ammonium Sulfate |
|---|---|---|---|
| \multicolumn{4}{l}{Unwashed solids from Mo—Ni Precipitation from PLS (wt. %)} | | | |
| 35 | 3.5 | 0.1 | 24 |
| \multicolumn{4}{l}{Mo—Ni Solids Repulping @25 wt. 5 solids & pH 2 water @80 C. - Filtrate Analyses} | | | |
| 0.25 | 3.5 | 0.014 | 88 |
| \multicolumn{4}{l}{Mo—Ni Solids Repulping @25 wt. 5 solids & pH 2 water @80 C. -Solid Analyses} | | | |
| 55.6 | 0.36 | 0.16 | 4 |
| \multicolumn{4}{l}{Repulped Cake Displacement Wash, pH 2, water @60 C., L:S ratio 1.6:1 - Wash Water Analyses} | | | |
| 2.1 | 4.7 | 0.01 | 45 |
| \multicolumn{4}{l}{Repulped Cake Displacement Wash, pH 2, water @60 C., L:S ratio 1.6:1 - Solid Analyses} | | | |
| 59.8 | 0.05 | 0.17 | 0.2 |

The solids were re-dissolved in hot, dilute ammonia to yield ammonium molybdate product as per the following reaction:

$$(NH_4)_4Mo_8O_{26} \cdot 5H_2O(s) + 12NH_3(aq)H_2O(aq) \rightarrow 8(NH_4)_2MoO_4(aq) \quad (2)$$

The primary acidic filtrate from the initial step, containing low soluble Mo, Ni & V values and high ammonium sulfate content and the secondary acidic filtrate containing low soluble Mo & V and high Ni and ammonium sulfate content are combined to form a mixture comprising metal levels of ~6-gpl Ni, 330-gpL ammonium sulfate and less than 500-ppm total of Mo and V as shown in Table 2.

TABLE 2

| Test # | Feed Type | H2S Over-pressure Kpa | Temp. °C. | Time (min.) | pH | Mo mg/L | Ni mg/L | V mg/L | Total mg/L |
|---|---|---|---|---|---|---|---|---|---|
| 1 | Batch | 100 | | 0 | 8.1 | 370 | 5,860 | 38 | 6,268 |
| | Pilot Sulfidation | (~14.5 psi) | 100 | 40 | 8.4 | <1 | <1 | <1 | <1 |
| 2 | Batch | 100 | | 0 | 8.1 | 410 | 6,400 | 36.4 | 6,846 |
| | Pilot Sulfidation | (~14.5 psi) | 100 | 40 | 8.3 | <1 | <1 | <1 | <1 |

The acidic solution pH is increased to ~8 with ammonia addition followed by sulfidation with $H_2S$ gas under pressure at 100-kPa for 1-hour. The pH is maintained between 8 and 8.5 at a temperature of 100° C. following which a precipitate of Mo, Ni and V compounds are obtained as per the following reactions:

$$Ni(NH_3)_2SO_4(aq) + H_2S(g) \rightarrow NiS(s) + (NH_4)_2SO_4(aq) \quad (3)$$

$$2NH_4VO_3(aq) + H_2S(aq) \rightarrow V_2O_4(s) + 2NH_3(aq) + S^0 + 2H_2O(aq) \quad (4a)$$

and/or $$NH_4VO_3(aq) + 4H_2S(aq) + 2NH_3(aq) \rightarrow (NH_4)_3VS_4(aq) + 3H_2O(aq) \quad (4b)$$

$$(NH_4)_2MoO_4(aq) + 3H_2S(g) \rightarrow MoS_3(s) + 4H_2O(aq) + 2NH_3(aq) \quad (5a)$$

and/or $$(NH_4)_2MoO_4(aq) + 3H_2S(g) \rightarrow (NH_4)_2MoS_4(aq) + 4H_2O \quad (5b)$$

As Table 2 indicates, all three metals precipitated to <5-ppm levels in the sulfided ammonium sulfate stream; although higher V and Mo levels are expected to be present in the ammonium sulfate stream (as a result of reactions 4b & 5b), it is believed that the high volumes of generated NiS (>9,000-ppm) from reaction 3 acted as a co-precipitant to partially and/or fully remove both Mo & V from the solution phase.

The sulfided ammonium sulfate slurry undergoes liquid-solid separation and the ammonium stream, containing less than 10-ppm total metals content and 30-gpL sulfamate, is further processed for recovering a purified ammonium sulfate product for use as fertilizer. Analysis of the final ammonium sulfate stream indicates 330 gpL ammonium sulfate, with less than 5 ppm combined Mo, Ni, and V.

The filtered solids are washed with fresh water to remove adhering ammonium sulfate and soluble sulfides and repulped to a density of ~20-wt % solids. The slurry is acidified to a pH ~5 and introduced into a reactor (70) for pressure leaching with oxygen gas at 165° C. and a total pressure of 1,100 kPag (160-psig). Table 3 illustrates complete conversion of the NiS solids into nickel sulfate within 1-hour with the product solution at an acidic pH of less than 1. The following reactions are believed to occur:

$$NiS(s) + 2O_2(g) \rightarrow NiSO_4 \quad (6)$$

$$V_2O_4(s) + 2H_2SO4(aq) \rightarrow 2VOSO_4(aq) + 2H_2O \quad (7)$$

$$S^0 + 3O_2(g)2H_2O(aq) \rightarrow 2H_2SO_4 \quad (8)$$

$$(NH_4)_2S(aq) + 2O_2(g) \rightarrow (NH_4)_2SO_4 \quad (9)$$

$$MoS_3(s) + 6O_2(g) + 4H_2O(aq) \rightarrow H_2MoO_4(aq) + 3H_2SO_4 \quad (10a)$$

and/or $$(NH_4)_2MoS_4(aq) + 8O_2 + 4H_2O \rightarrow H_2MoO_4(aq) + (NH_4)_2SO_4(aq) + 3H_2SO_4(aq) \quad (10b)$$

TABLE 3

Oxidation of NiS Cake from Sulfidation Step

| Test # | Temp °C. | O2 Pressure Psi | Total Pressure Psig | Wt. % Solids | Initial pH | Final pH | Retention Time Hrs | Final Ni gpL | Ni Extm % |
|---|---|---|---|---|---|---|---|---|---|
| 1 | 165 | 72 | 159 | 21.9 | 4.5 | 0.9 | 2 | 75.1 | >99% |
| 2 | 165 | 72 | 159 | 17 | 5.6 | 0.87 | 1 | 56.0 | >99% |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. /////

The invention claimed is:

1. A method of recovering metals from a used catalyst comprising the steps of:
   (a) leaching a Group VB metal, a Group VIB metal and a Group VIII metal from the used catalyst with an ammonia containing leach solution at a temperature and a pressure sufficient to form a pressure leach slurry comprising at least a Group VIB soluble metal complex and at least a Group VIII soluble metal complex and a first solid residue;
   (b) separating and removing the first solid residue from the pressure leach slurry to form a first pressure leach solution comprising the Group VIB soluble metal complex and the Group VIII soluble metal complex;
   (c) precipitating from the first pressure leach solution, at a first pre-selected pH, a second solid residue comprising at least a portion of the Group VIB soluble metal complex to form a first slurry comprising the second solid residue and at least a portion of the Group VIII soluble metal complex;
   (d) separating from the first slurry the second solid residue and a primary filtrate substantially free of Group VB, Group VIB and the Group VIII metals;
   (e) dissolving the second solid residue at a second pre-selected pH to form a group VIB metal precipitate and a group VIII metal containing solution;
   (f) separating the group VIB metal precipitate from the Group VIII metal containing solution of step (e);
   (g) dissolving said Group VIB metal precipitate in a dilute base at a sufficient temperature to form a Group VIB soluble metal product.

2. The method of claim 1 wherein the step (f) further comprises:
   (i) recovering a secondary filtrate comprising substantially the Group VIII soluble metal complex and a trace amount of Group VB and Group VIB metals;
   (ii) combining the secondary filtrate with the primary filtrate from step (d) to form a combined filtrate comprising substantially the Group VIII soluble metal complex and a trace quantity of Group VB and Group VIB metals;
   (iii) precipitating from the combined filtrate the Group VB, Group VIB and Group VIII metals in a sulfidation process to form a third solid residue and a tertiary filtrate;
   (iv) separating the third solid residue from the tertiary filtrate and dissolving the third solid residue to form a group VIII metal product solution.

3. The method of claim 2 further comprising, subjecting the tertiary filtrate to hydrolysis to form a purified solution.

4. The method of claim 3 wherein the purified solution is ammonium sulfate.

5. The method of claim 1 wherein the precipitation step (c) is carried out at a pH in a range between 2.5 to 3.5, at a temperature between about 75° C. and 85° C. for at least two hours.

6. The method of claim 1 wherein the first solid residue comprises at least a Group VB metal, a Group VB metal complex and Coke.

7. The method of claim 6, wherein the Group VB metal is vanadium, and wherein the Group VB metal complex comprises ammonium metavanadate.

8. The method of claim 1 wherein the separation steps (b), (d) and (f) each comprise at least a separation means selected from settling, filtration, decantation, centrifugation and combinations thereof.

9. The method of claim 1, wherein the primary filtrate comprises 0.1 to 3% of the Group VIB metal in the used catalyst, 1 to 20% of the Group VB metal in the used catalyst, and 1 to 35% of the Group VIII metal in the used catalyst.

10. The method of claim 2, wherein the combined filtrate comprises at least a portion of the Group VB metal, Group VIB metal and at least a portion of the Group VIII metal, wherein the sulfidation process is carried out at a third pre-selected pH to precipitate as metal sulfides and oxy-hydroxides at least 95% of the Group VB metal, at least 95% of the Group VIB metal and at least 95% of the Group VIII metal present in the combined filtrate.

11. The method of claim 2, wherein the separation step (iv) comprises at least a separation means selected from settling, filtration, decantation, centrifugation and combinations thereof.

12. The method of claim 11 wherein the tertiary filtrate comprises less than 100 ppm of the group VIB metal, less than 20 ppm of the Group VIII metal, and less than 100 ppm of the Group VB metal.

13. The method of claim 1, wherein at least 90% of the Group VIB metal precipitates from the pressure leach solution as a metal complex.

14. The method of claim 1, wherein the Group VIB metal is molybdenum and wherein the first pre-selected pH is in the range of 2.5 to 3.3 to precipitate greater than 90% of the molybdenum as a molybdate complex.

15. The method of claim 14, wherein the pressure leach solution (PLS) is adjusted to the first pre-selected pH by adding to the PLS at least one of a mineral acid or a sulfur compound having a sulfhydryl group or an ionized sulfhydryl group, or mixtures thereof.

16. The method of claim 15, wherein the pH of the PLS is adjusted to a pH of 3.5 or less with an acid selected from the group of sulfuric acid, hydrochloric acid, phosphoric acid and nitric acid.

17. The method of claim 16, wherein the PLS is adjusted to a pH of 3 or less with the addition of a sulfuric acid for at least 95% of the molybdenum to precipitate out as an octamolybdate complex.

18. The method of claim 15, wherein the pH of the pressure leach solution is adjusted to a pH of 3 or less with at least one of a water soluble sulfide, a water soluble polysulfide, or mixtures thereof.

19. The method of claim 1, wherein the Group VIB metal in the used catalyst is molybdenum, the Group VIII metal in the used catalyst is nickel, the Group VB metal in the used catalyst is vanadium.

20. The method of claim 2, wherein at least one of a water soluble sulfide, a water soluble polysulfide, or mixtures thereof is added to the combined filtrate for a pH level of between 6 and 9 to obtain a precipitate of Mo, Ni, and V sulfides and oxy hydroxides or combinations thereof.

21. The method of claim 20, wherein $H_2S$ is added to the combined filtrate at a pressure from atmospheric to 100 psig, a temperature ranging from 50 to 110° C. for at least 30 minutes.

22. The method of claim 2, wherein the Group VIB metal in the used catalyst is molybdenum, the Group VIII metal in the used catalyst is nickel, the Group VB metal in the used catalyst is vanadium, the pressure leach solution is adjusted to a pH of 3 or less with the addition of sulfuric acid to precipitate and form the second solid residue comprising at least 95% of the molybdenum as an octamolybdate complex and at least 75% of the nickel as a nickel ammonium sulfate compound, at least partially dissolving the second solid residue in acidic water having a pH of 2.5 or less at a temperature of 80° C. to form an octamolybdate precipitate and a solution of the double salt of nickel and dissolving the octamolybdate precipitate in a dilute ammonia at a temperature ranging from 50° C. to 75° C. to form an ammonium molybdate product.

23. The method of claim 22 further comprising: separating the octamolybdate precipitate from the double salt of nickel solution to form the secondary filtrate; combining the primary filtrate and the secondary filtrate to form the combined filtrate comprising at least 80% of the nickel present in the used catalyst, from 0.1 to 3% of the molybdenum present in the used catalyst and from 1 to 20% of the vanadium present in the used catalyst; adding $H_2S$ to the combined filtrate at a pressure from atmospheric to 100 psig and at a temperature ranging from 50-110° C. to obtain the third solid residue, which comprises a precipitate of Mo and Ni sulfides and V oxy-hydroxides; separating the Mo, Ni, and V sulfides and oxy-hydroxides by filtration to obtain the tertiary filtrate, which comprises 100 to 1000 gpL ammonium sulfate, less than 100 ppm molybdenum, less than 20 ppm nickel, and less than 100 ppm vanadium.

24. The method of claim 23 further comprising: dissolving the third solid residue at a pH of five or less in the presence of oxygen at a temperature between 150° C. and 170° C., a total pressure ranging from 150 psig to 170 psig for a time between 30 minutes and 1.5 hours to obtain a nickel sulfate product solution.

25. A method of recovering metals from a used catalyst originating from a hydroprocessing catalyst having a general formula $(X)_a(M)_b[(CH_3CH_2)_cN(CH_3)_3]_dO_z$ and containing at least a group VB metal, wherein X is a Group VIII non-noble metal, M is a group VIB metal selected from Mo and W and combinations thereof, c is an integer from 10 to 40, the molar ratio of a:b is from 0.5/1 to 3/1, the method comprising the steps of:
(a) leaching a Group VB metal, a Group VIB metal and a Group VIII metal from the used catalyst with an ammonia containing leach solution at a temperature and a pressure sufficient to form a pressure leach slurry comprising at least a Group VIB soluble metal complex and at least a Group VIII soluble metal complex and a first solid residue;
(b) separating and removing the first solid residue from the pressure leach slurry to form a first pressure leach solution comprising the Group VIB soluble metal complex and the Group VIII soluble metal complex;
(c) precipitating from the first pressure leach solution, at a first pre-selected pH, a second solid residue comprising at least a portion of the Group VIB soluble metal complex to form a first slurry comprising at least a portion of the Group VIII soluble metal complex;
(d) separating from the first slurry the second solid residue and a primary filtrate substantially free of Group VB, Group VIB and the Group VIII metals;
(e) dissolving the second solid residue at a second pre-selected pH to form a group VIB metal precipitate and a group VIII metal containing solution;
(f) separating the group VIB metal precipitate from the Group VIII metal containing solution of step (e) and dissolving said Group VIB metal precipitate in a dilute base at a sufficient temperature to form a Group VIB metal product.

26. The method of claim 25, further comprising the steps of:
(i) recovering a secondary filtrate comprising substantially the Group VIII soluble metal complex and a trace amount of Group VB and Group VIB metals;
(ii) combining the secondary filtrate with the primary filtrate of step (d) to form a combined filtrate comprising substantially the Group VIII soluble metal complex and a trace quantity of Group VB and Group VIB metals;
(ii) precipitating from the combined filtrate the Group VB, Group VIB and Group VIII metals in a sulfidation process to form a third solid residue and a tertiary filtrate;
(iv) separating the third solid residue from the tertiary filtrate and dissolving the third solid residue to form a group VIII metal product solution.

27. The method of claim 26, wherein the Group VIB metal is molybdenum and wherein the pre-selected pH is in the range of 2.5 to 3.3 to precipitate greater than 90% of the molybdenum.

28. The method of claim 25, wherein the used catalyst originates from a hydroprocessing catalyst having a median particle size of 0.01 to 200 microns.

29. The method of claim 25, wherein the used catalyst has a pore volume of 0.05-5 ml/g as determined by nitrogen adsorption.

30. A method of recovering metals, including vanadium, from a used catalyst having a general formula $(M^t)_a(X^u)_b$ $(S^v)_d (C^w)_e (H^x)_f (O^y)_g (N^z)_h$ containing at least a Group VB metal, wherein M is at least one group VIB metal, X is at least one of a non-noble Group VIII metal, a Group VIIIB metal, a Group VIB metal, a Group IVB metal, and a Group IIB metal, $0=<b/a=<5$, $(a+0.5b)<=d<=(5a+2b)$, $0<=e<=11(a+b)$, $0<=f<=7(a+b)$, $0<=g<=5(a+b)$, $0<=h<=0.5(a+b)$; t, u, v, w, x, y, z, each representing total charge for each of: M, X, S, C, H, O and N, respectively; $ta+ub+vd+we+xf+yg+zh=0$ the method comprising the steps of:

(a) leaching a Group VB metal, a Group VIB metal and a Group VIII metal from the used catalyst with an ammonia containing leach solution at a temperature and a pressure sufficient to form a pressure leach slurry comprising at least a Group VIB soluble metal complex and at least a Group VIII soluble metal complex and a first solid residue;

(b) separating and removing the first solid residue from the pressure leach slurry to form a first pressure leach solution comprising the Group VIB soluble metal complex and the Group VIII soluble metal complex;

(c) precipitating from the first pressure leach solution, at a first pre-selected pH, a second solid residue comprising at least a portion of the Group VIB soluble metal complex to form a first slurry comprising the second solid residue and at least a portion of the Group VIII soluble metal complex;

(d) separating from the first slurry the second solid residue and a primary filtrate substantially free of Group VB, Group VIB and the Group VIII metals;

(e) dissolving the second solid residue at a second pre-selected pH to form a Group VIB metal precipitate and a Group VIII metal containing solution;

(f) separating the Group VIB metal precipitate from the Group VIII metal containing solution of step (e) and dissolving said Group VIB metal precipitate in a dilute base at a sufficient temperature to form a Group VIB metal product;

(g) recovering a secondary filtrate comprising substantially the Group VIII soluble metal complex and a trace amount of Group VB and Group VIB metals;

(h) combining the secondary filtrate with the primary filtrate of step (d) to form a combined filtrate comprising substantially the Group VIII soluble metal complex and a trace quantity of Group VB and Group VIB metals;

(i) precipitating from the combined filtrate the Group VB, Group VIB and Group VIII metals in a sulfidation process to form a third solid residue and a tertiary filtrate;

(j) separating the third of solid residue from the tertiary filtrate and dissolving the third solid residue to form a Group VIII metal product solution.

* * * * *